(12) United States Patent
Sanzari et al.

(10) Patent No.: US 12,392,376 B2
(45) Date of Patent: Aug. 19, 2025

(54) METHOD OF PRODUCING A GAS TURBINE ENGINE BEARING HOUSING

(71) Applicant: Pratt & Whitney Canada Corp., Longueuil (CA)

(72) Inventors: Lorenzo Sanzari, Montreal (CA); Jocelyn Bisson, Saint-Basile-le-Grand (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/417,862

(22) Filed: Jan. 19, 2024

(65) Prior Publication Data
US 2025/0237266 A1 Jul. 24, 2025

(51) Int. Cl.
*F16C 35/04* (2006.01)

(52) U.S. Cl.
CPC ........ *F16C 35/042* (2013.01); *F16C 2226/00* (2013.01); *F16C 2360/23* (2013.01)

(58) Field of Classification Search
CPC .......... F01D 25/18; F01D 25/162; F02C 7/06; F16C 2360/23; F16C 2206/00; F16C 35/042; F16N 21/00
USPC ....................................................... 184/6.11
See application file for complete search history.

(56) References Cited

U.S. PATENT DOCUMENTS

| | | | |
|---|---|---|---|
| 8,371,127 B2 * | 2/2013 | Durocher ................. | F02C 7/12 60/806 |
| 9,429,191 B2 * | 8/2016 | Ertas ....................... | F16C 43/02 |
| 10,113,483 B2 | 10/2018 | Manteiga | |
| 10,161,264 B2 * | 12/2018 | Husband ................ | F01D 25/164 |
| 10,393,303 B2 * | 8/2019 | Hendrickson ......... | F16L 15/001 |
| 10,443,445 B2 * | 10/2019 | Liebl ..................... | F01D 25/162 |
| 10,605,119 B2 * | 3/2020 | Ward ...................... | F01D 9/065 |
| 10,830,098 B2 * | 11/2020 | Stiehler ................. | F01D 25/243 |
| 10,830,139 B2 * | 11/2020 | Hendrickson ......... | F16L 39/005 |
| 10,982,562 B2 * | 4/2021 | Stiehler .................... | F02C 7/06 |
| 11,149,640 B2 * | 10/2021 | Freeman ............... | F01D 25/183 |
| 11,459,909 B2 * | 10/2022 | Diosady ................. | F01D 25/12 |
| 11,525,399 B1 * | 12/2022 | Smith ..................... | F02C 7/224 |
| 11,859,503 B1 * | 1/2024 | Lefebvre ............... | F01D 21/003 |

(Continued)

FOREIGN PATENT DOCUMENTS

FR 3108687 B1 2/2022

OTHER PUBLICATIONS

EP Search Report for EP Patent Application No. 25152825.3 dated Jun. 10, 2025.

*Primary Examiner* — Henry Y Liu
(74) *Attorney, Agent, or Firm* — Getz Balich LLC (57) ABSTRACT

A method of manufacturing an annular bearing housing for a gas turbine engine is provided that includes: producing a flange outer structure segment; producing an intermediate structure segment having an outer radial end, an inner radial end, a body that extends between the outer radial end and the inner radial end, and a branch member that extends outwardly from the body; producing a main body segment; attaching the flange outer structure segment to the outer radial end of the intermediate structure segment; and attaching the main body segment to the inner radial end of the intermediate structure segment. At least one of the flange outer structure segment, the intermediate structure segment, or the main body segment is produced using an additive manufacturing process.

15 Claims, 5 Drawing Sheets

(56) References Cited

U.S. PATENT DOCUMENTS

| | | | | |
|---|---|---|---|---|
| 11,988,106 | B2* | 5/2024 | Neuberger | F01D 25/08 |
| 2015/0104123 | A1* | 4/2015 | Ertas | F16C 32/0677 |
| | | | | 384/119 |
| 2016/0281534 | A1* | 9/2016 | Noel | F01D 25/18 |
| 2016/0290164 | A1* | 10/2016 | Liebl | F01D 25/145 |
| 2017/0298766 | A1* | 10/2017 | Ertas | F01D 25/164 |
| 2017/0306795 | A1 | 10/2017 | Davis | |
| 2018/0135517 | A1* | 5/2018 | Mook | F04D 29/541 |
| 2018/0221958 | A1* | 8/2018 | Torun | B22F 7/08 |
| 2018/0223734 | A1* | 8/2018 | Hendrickson | F16L 15/006 |
| 2018/0224043 | A1* | 8/2018 | Hendrickson | F01D 25/162 |
| 2018/0306061 | A1* | 10/2018 | Husband | F16C 27/02 |
| 2019/0093507 | A1* | 3/2019 | Ward | F01D 9/065 |
| 2019/0368393 | A1* | 12/2019 | Edwards | F02C 7/36 |
| 2020/0300119 | A1* | 9/2020 | Mason | F02C 7/06 |
| 2021/0079842 | A1* | 3/2021 | Freeman | F02C 7/06 |
| 2022/0082029 | A1* | 3/2022 | Diosady | F28F 5/00 |
| 2024/0003262 | A1* | 1/2024 | Lefebvre | F02C 3/04 |

* cited by examiner

METHOD OF PRODUCING A GAS TURBINE ENGINE BEARING HOUSING

BACKGROUND OF THE INVENTION

1. Technical Field

The present disclosure relates to gas turbine engine bearing housings in general and to methods for producing a gas turbine engine bearing housings in particular.

2. Background Information

Bearing housings are important structures within a gas turbine engine for supporting and aligning rotating components within the engine such as a fan shaft, a low speed shaft, and a high speed shaft. Bearing housings are typically complex structures that must meet stringent performance, safety and reliability requirements. In the operating environment of a gas turbine, a bearing housing may be subject to a harsh temperature environment (e.g., a large range of operating temperatures and/or a large temperature gradients) and may be subject to considerable stress and vibrational modes. Hence, the method of manufacturing the bearing housing structure and the resultant structure are important items. Improvements in methods of manufacturing a bearing housing are therefore always desirable.

SUMMARY

According to an aspect of the present disclosure, a method of manufacturing an annular bearing housing for a gas turbine engine is provided. The method includes: producing a flange outer structure segment; producing an intermediate structure segment having an outer radial end, an inner radial end, a body that extends between the outer radial end and the inner radial end, and a branch member that extends outwardly from the body; producing a main body segment; attaching the flange outer structure segment to the outer radial end of the intermediate structure segment; and attaching the main body segment to the inner radial end of the intermediate structure segment. At least one of the flange outer structure segment, the intermediate structure segment, or the main body segment is produced using an additive manufacturing process.

In any of the aspects or embodiments described above and herein, the body of the intermediate structure segment may have inner and outer radial side surfaces, and the branch member may extend outwardly from the outer radial side surface, and the branch member may include a ring portion and a radial flange portion.

In any of the aspects or embodiments described above and herein, the ring portion of the branch member may be configured to communicate with an engine oil conduit.

In any of the aspects or embodiments described above and herein, a coupling may be integrally formed with the ring portion of the branch member, wherein the coupling is configured to communicate with the engine oil conduit.

In any of the aspects or embodiments described above and herein, the flange outer structure segment may be attached to the outer radial end of the intermediate structure segment by weldment and the main body segment may be attached to the inner radial end of the intermediate structure segment by weldment.

In any of the aspects or embodiments described above and herein, the method may include producing at least one plenum structure segment and attaching the at least one plenum structure segment to the main body segment by weldment.

In any of the aspects or embodiments described above and herein, the at least one plenum structure segment may include a first plenum structure segment, a second plenum structure segment, and a third plenum structure segment and the method may include attaching the first, second, and third plenum structure segments to the main body segment by weldment.

In any of the aspects or embodiments described above and herein, the main body segment may include a central member having a first plenum structure branch, a second plenum structure branch, and a third plenum structure branch, and the first plenum structure segment may be attached to the first plenum structure branch, and the second plenum structure segment may be attached to the second plenum structure branch, and the third plenum structure segment may be attached to the third plenum structure branch.

In any of the aspects or embodiments described above and herein, the intermediate structure segment may be produced using the additive manufacturing process, and the step of producing the intermediate structure segment may include producing an intermediate structure segment initial form having a first body of material integrally formed with the body of the intermediate structure segment, a second body of material integrally formed with the body of the intermediate structure segment, and a third body of material integrally formed with the branch member, and the method may include processing the first body of material to form the outer radial end and processing the second body of material to form the inner radial end.

In any of the aspects or embodiments described above and herein, the processing the first body of material to form the outer radial end may include removing a portion of the first body of material to form the outer radial end, and the processing the second body of material to form the inner radial end may include removing a portion of the second body of material to form the inner radial end.

In any of the aspects or embodiments described above and herein, the intermediate structure segment initial form may include a third body of material integrally formed with the branch member, and the step of producing the intermediate structure segment may include processing the third body of material to form the branch member.

In any of the aspects or embodiments described above and herein, the branch member may include a ring portion and a radial flange portion, and the step of processing the third body of material to form the branch member may include removing a portion of the third body of material to form the radial flange portion.

According to another aspect of the present disclosure, a method of manufacturing an annular bearing housing for a gas turbine engine is provided. The annular bearing housing has a circumference. The method includes: producing a flange outer structure segment; producing an intermediate structure segment having inner and outer radial ends, a body that extends between the inner and outer radial ends, a branch member that extends outwardly from the body, and a fluid conduit, wherein the branch member includes a ring portion and a flange portion, and the ring portion extends between body and the flange portion, and wherein a first end of the fluid conduit is disposed adjacent the ring portion and a second end of the fluid conduit is disposed adjacent the inner radial end; producing a main body segment; wherein the intermediate structure segment is produced using an additive manufacturing process; attaching the flange outer structure segment to the outer radial end of the intermediate structure segment; and attaching the main body segment to the inner radial end of the intermediate structure segment.

In any of the aspects or embodiments described above and herein, the intermediate structure may include a web portion that extends between the fluid conduit and the body.

According to another aspect of the present disclosure, an annular bearing housing for a gas turbine engine is provided. The annular bearing housing has a circumference, a flange outer structure segment, an intermediate structure segment, and a main body segment. The intermediate structure segment has inner and outer radial ends, a body that extends between the inner and outer radial ends, a branch member that extends outwardly from the body, and a fluid conduit. The branch member includes a ring portion and a flange portion, and the ring portion extends between body and the flange portion. A first end of the fluid conduit is disposed adjacent the ring portion and a second end of the fluid conduit is disposed adjacent the inner radial end. The fluid conduit is integral with the body and the branch member.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
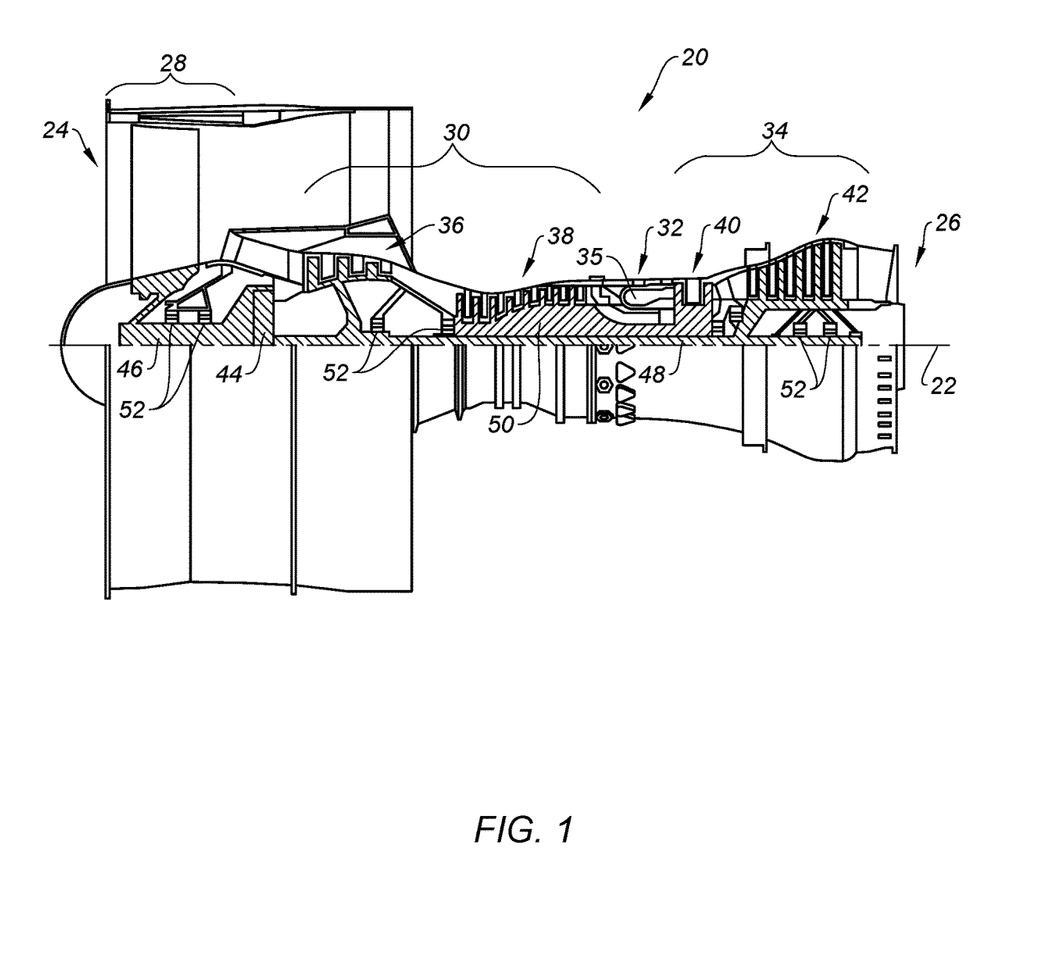
FIG. 1 is a diagrammatic perspective view of a present disclosure battery enclosure embodiment.

FIG. 1 shows a partially sectioned diagrammatic view of a geared gas turbine engine 20. The gas turbine engine 20 extends along an axial centerline 22 between an upstream air flow inlet 24 and a downstream air flow exhaust 26. The gas turbine engine 20 includes a fan section 28, a compressor section 30, a combustor section 32, and a turbine section 34. The combustor section 32 includes a combustor 35. The compressor section 30 includes a low pressure compressor (LPC) 36 and a high pressure compressor (HPC) 38. The turbine section 34 includes a high pressure turbine (HPT) 40 and a low pressure turbine (LPT) 42. The engine sections are arranged sequentially along the centerline 22. The fan section 28 is connected to a geared architecture 44, for example, through a fan shaft 46. The geared architecture 44 and the LPC 36 are connected to and driven by the LPT 42 through a low speed shaft 48. The HPC 38 is connected to and driven by the HPT 40 through a high speed shaft 50. The aforesaid shafts 46, 48, 50 are supported by bearings 52.

The terms "forward", "leading", "aft, "trailing" are used herein to indicate the relative position of a component or surface within the gas turbine engine. In a conventional axial flow gas turbine engine like that shown in FIG. 1, the core gas flow travels substantially parallel to the axial centerline 22 of the engine. As core gas air passes through the engine 20, the core gas passes through the compressor section 30 before it enters the combustor section 32; hence, the compressor section 30 is "forward" of the combustor section 32. The core gas exits the combustor section 32 and enters the turbine section; hence, the turbine section is "aft" of the combustor section 32. The terms "inner radial" and "outer radial" refer to relative radial positions from the engine centerline 22. An inner radial component or path is disposed radially closer to the engine centerline 22 than an outer radial component or path.

Figure 2:
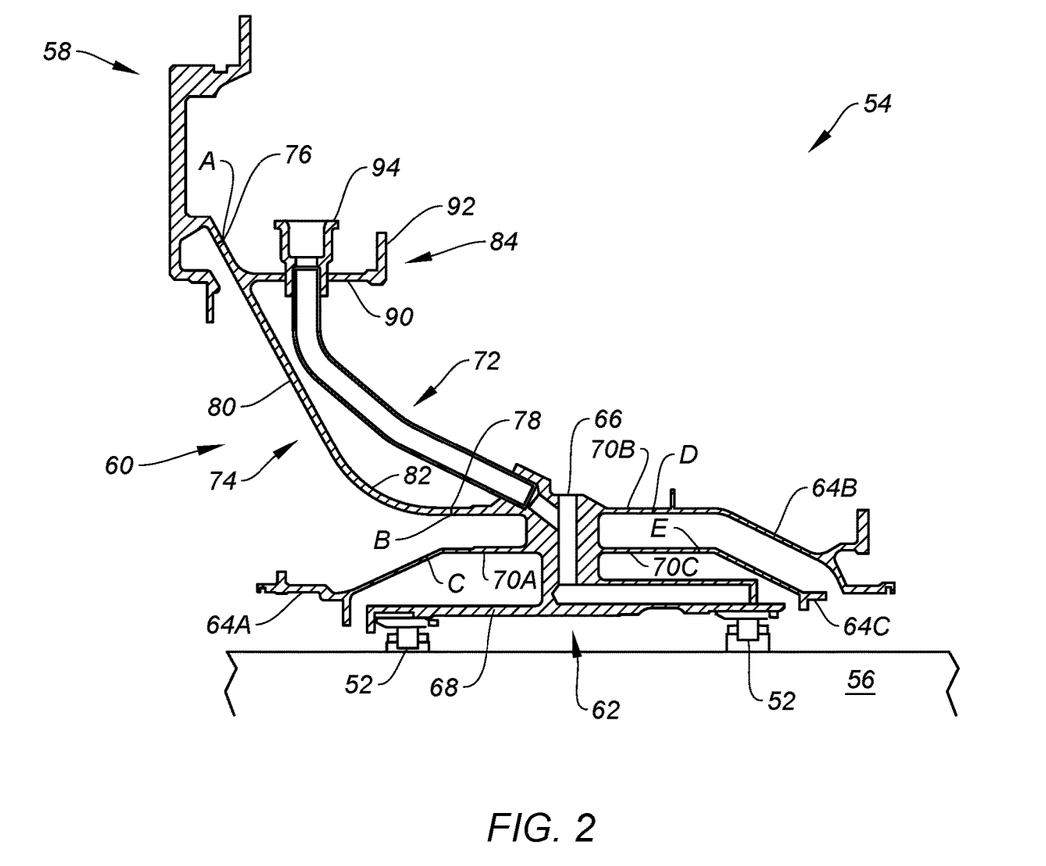
FIG. 2 is a diagrammatic sectional representation of an annular bearing housing relative to a rotating member.
Figure 3:
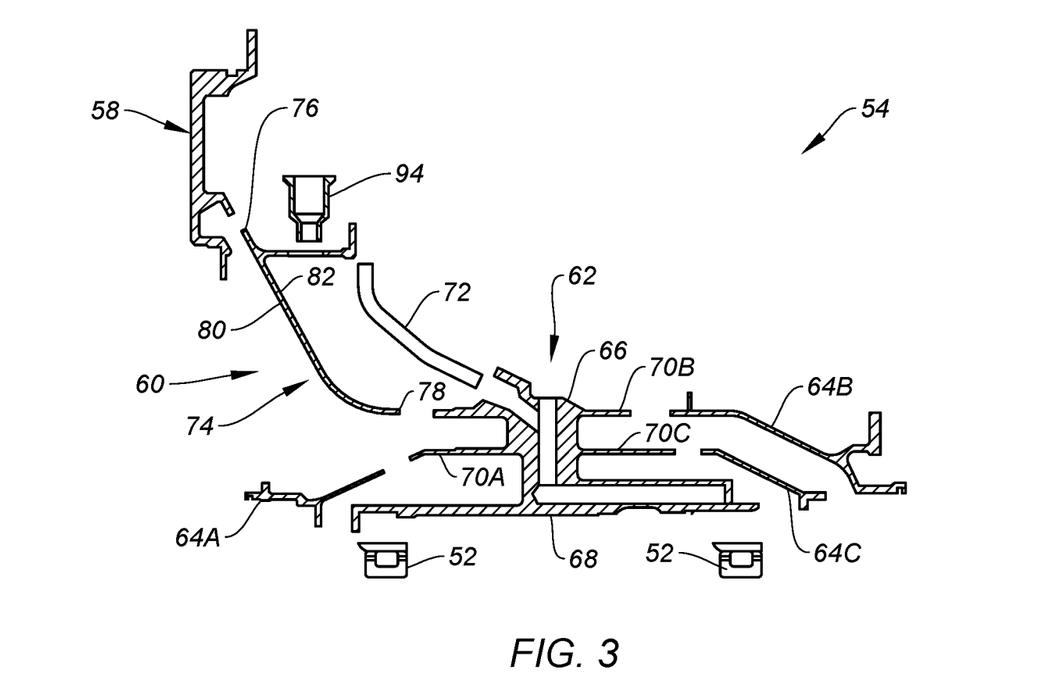
FIG. 3 illustrates the same sectional representation of the annular bearing housing shown in FIG. 2, with housing segments shown in an exploded view.

Bearing housings are important structures within a gas turbine engine for supporting and aligning rotating components within the engine such as, but not limited to, the low speed shaft 48 and the high speed shaft 50. FIG. 2 diagrammatically illustrates a sectional view of an annular bearing housing 54 relative to a rotating member 56. The bearing housing 54 includes a plurality of bearing housing segments that collectively form the bearing housing 54. FIG. 3 illustrates the same sectional view of the annular bearing housing 54 shown in FIG. 2, with the segments shown in an exploded view to facilitate the description herein. The diagrammatically shown segments may be described as including a flange outer structure segment 58, an intermediate structure segment 60, a main body segment 62, and a plurality of plenum structure segments 64A-C. The main body segment 62 includes a central member 66 and a bearing mounting panel 68. The plurality of plenum structure segments 64A-C extend outwardly from the central member 66 of the main body segment 62. The respective plenum structure segments 64A-C may be configured to define a respective annular plenum that is intended to contain an airflow (e.g., cooling air, or air that is used for purging purposes, or the like), or a liquid flow (e.g., engine oil or other lubricant) that may be used for lubrication purposes and/or for cooling purposes, or both an airflow and a liquid flow. FIG. 2 diagrammatically illustrates a first plenum structure segment 64A extending out from the main body segment 62 on a first axial side of the main body segment 62, and a second plenum structure segment 64B and a third plenum structure segment 64C extending out from the main body segment 62 on a second axial side of the main body segment 62, opposite the first axial side. In the example bearing housing 54 embodiment shown in FIG. 3, the central member 66 of the main body segment 62 includes a plurality of plenum structure branches 70A-C, each configured for engagement with a respective plenum structure segment 64A-C; e.g., a first plenum structure branch 70A, a second plenum structure branch 70B, and a third plenum structure branch 70C. Collectively, the respective plenum structure branches 70A-C and plenum structure segments 64A-C once joined form the respective annular plenums. The present disclosure does not require the central member 66 of the main body segment 62 to include plenum structure branches 70A-C; e.g., in some embodiments the respective plenum structure segments 64A-C may be configured for attachment directly to the central member 66 of the main body segment 62. The present disclosure is not limited to a bearing housing 54 having any particular number of plenum structure segments 64A-C or any particular configurations for the plenum structure segments 64A-C. The bearing mounting panel 68 of the main body segment 62 is configured to support at least one bearing 52 disposed between the bearing housing 54 and the rotating member 56. In the example embodiment diagrammatically shown in FIG. 2, the bearing mounting panel 68 of the main body segment 62 is configured to support a pair of bearings 52. The bearing housing 54 may be configured to permit mounting of an independent engine oil conduit 72 that extends between the intermediate structure segment 60 and the main body segment 62. In some embodiments, all or a portion of the engine oil conduit 72 may be an integral element of the bearing housing 54. Passages disposed within the central member 66 of the main body segment 62 provide a fluid flow path from the engine oil conduit 72 to the region adjacent the bearings.

Figure 4:
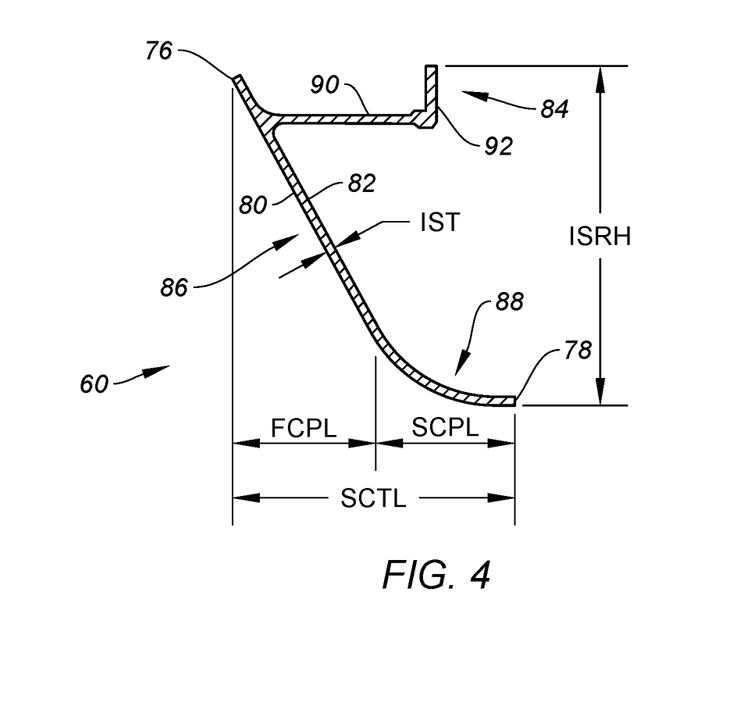
FIG. 4 is a diagrammatic sectional representation of an intermediate structure segment of the annular bearing housing shown in FIG. 2.

Referring to FIG. 4, the intermediate structure segment 60 includes a body 74 that extends between an outer radial end 76 and an inner radial end 78. The body 74 has an inner radial side surface 80, an outer radial side surface 82 opposite the inner radial side surface 80, and a branch member 84 that extends outward from outer radial side surface 82 proximate the outer radial end 76. The annular body 74 of the intermediate structure segment 60 is configured with a first conical portion 86 and a second conical portion 88. The first conical portion 86 extends from the outer radial end 76 to the second conical portion 88, and the second conical portion 88 extends from the inner radial end 78 to the first conical portion 86. In the example embodiment shown in FIG. 4, the first conical portion 86 has a straight conical configuration, and the second conical portion 88 has semi-conical configuration, with an arcuately shaped sub-portion and an axially extending sub-portion. The first conical portion 86 extends an axial length ("FCPL"), the second conical portion 88 extends an axial length ("SCPL"), and the intermediate structure segment 60 extends a total axial length ("ISTL") equal to the sum of the first conical portion axial length and the second conical portion axial length (ISTL=FCPL+SCPL). The annular intermediate structure segment 60 may be described as having a radial height (ISRH) that extends between the outer and inner radial ends 76, 78. The intermediate structure body 74 may be described as having a thickness ("IST") that extends along a line perpendicular to the inner and outer radial side surfaces 80, 82. In the example embodiment shown in FIG. 4, the intermediate structure segment body 74 has a generally constant thickness but the present disclosure is not limited to this configuration. In the intermediate structure segment 60 embodiment shown in FIG. 2, the branch member 84 that extends outward from outer radial side surface 82 of the intermediate structure segment body 74 includes a ring portion 90 and a radial flange portion 92. The ring portion 90 extends generally in an axial direction and is configured to support the engine oil conduit 72 extending between the intermediate structure segment 60 and the main body segment 62. The annular bearing housing 54 may include a plurality of engine oil conduits 72 disposed around the circumference of the bearing housing 54. In these embodiments, the branch member 84 may be configured to support each of the engine oil conduits 72. A coupling 94 may be used to mount the engine oil conduit 72 to the ring portion 90 of the branch member 84. In some embodiments, the coupling(s) 94 may be independent of the branch member 84. In other embodiments, the coupling(s) 94 may be integral to the branch member 84.

Figure 5:
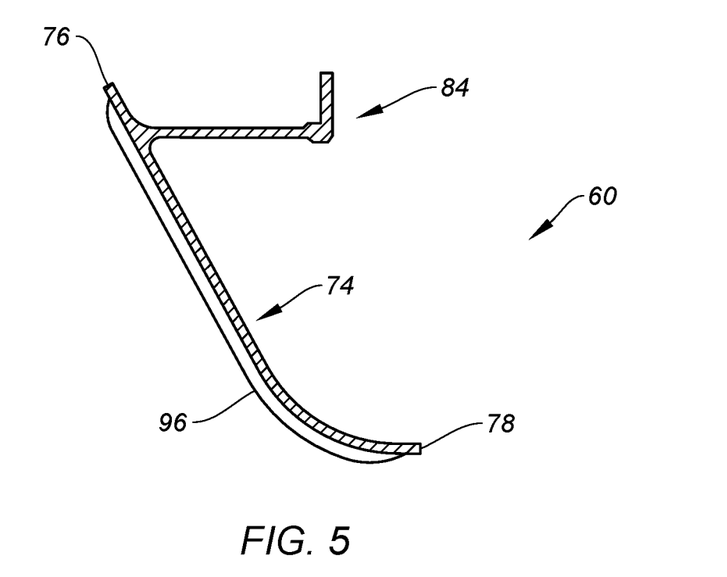
FIG. 5 is a diagrammatic sectional representation of an intermediate structure segment embodiment.
Figure 6:
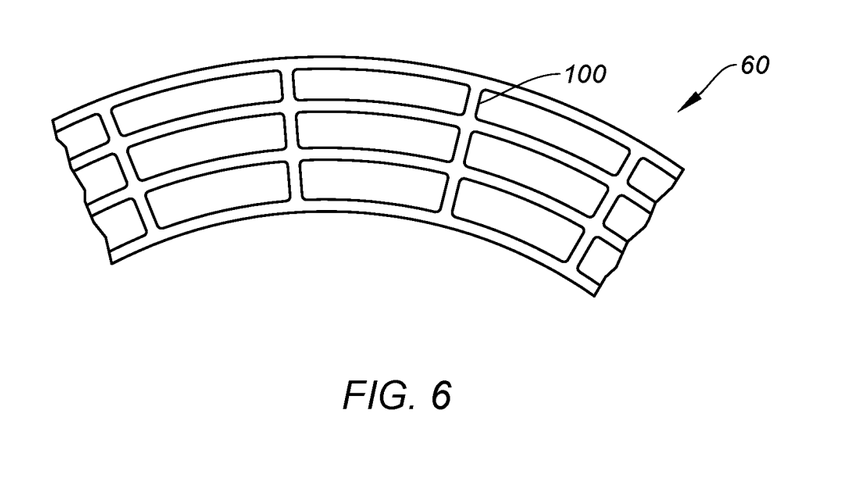
FIG. 6 is a diagrammatic representation of an intermediate structure segment embodiment.

Referring to FIGS. 5 and 6, in some embodiments the intermediate structure segment 60 may include features configured to increase one or more mechanical properties (e.g., rigidity, torsional stiffness, and the like) of the intermediate structure segment 60. FIG. 5 diagrammatically illustrates a rib 96 (e.g., a feature) extending out from the inner radial side surface 80 of intermediate structure segment 60 (or from the outer radial side surface 82). FIG. 6 diagrammatically illustrates a lattice structure 98 (e.g., a feature) extending out from a radial side surface 80, 82 of intermediate structure segment 60. Ribs 96 and lattice structure 98 are non-limiting examples of features configured to increase the mechanical properties of the intermediate structure segment 60 that may be included.

Aspects of the present disclosure are directed to a method for manufacturing an annular bearing housing 54. As can be seen from FIG. 2, the bearing housing 54 is a complex structure that must meet stringent performance, safety and reliability requirements. In the operating environment of a gas turbine, the bearing housing 54 may be subject to a harsh temperature environment; e.g., a large range of operating temperatures and/or a large temperature gradient across segments of the bearing housing 54. Segments of the bearing housing 54 may also be subject to considerable stress and vibrational modes. In some embodiments, the bearing housing segments (e.g., the flange outer structure segment 58, the intermediate structure segment 60, the main body segment 62, and the plenum structure segments 64A-C when included) may be produced individually and the individual segments subsequently combined to produce the bearing housing 54.

The present disclosure method includes producing one or more of the bearing housing segments using an additive manufacturing process. Examples of acceptable additive manufacturing processes include those that deposit layers of material (usually in the form of a metal powder) and subsequently subject the deposited material layer to a source of energy that causes the deposited material layer to melt and bond with a substrate; e.g., a substrate formed from previously deposited material layers. The deposition process is typically computer controlled based on an input data package (e.g., a computer-aided design or "CAD" file) that defines the structure to be formed. The input energy used to melt the deposited material layer for bonding with the substrate may be provided by one or more lasers, or an electron beam or the like. Depending on the process and/or the material used to form the structure, post processing steps (e.g., annealing, surface finishing, or the like) may or may not be utilized.

An example of a bearing housing segment that may be formed using an additive manufacturing process is the intermediate structure segment 60 of the bearing housing 54. The configuration of the intermediate structure segment 60 (e.g., the considerable total axial length (ISTL) and radial height (ISRH), and the geometry of intermediate structure segment 60, including the first conical portion 86, the second conical portion 88, and the branch member 84) limit the processes that may be used to produce the intermediate structure segment 60. A manufacturing process that includes forming the intermediate structure segment 60 from a forging by removing material is a time consuming and expensive process that yields a considerable amount of scrap material. The present disclosure method of producing the intermediate structure segment 60 using an additive manufacturing process saves time and cost.

Figure 8:
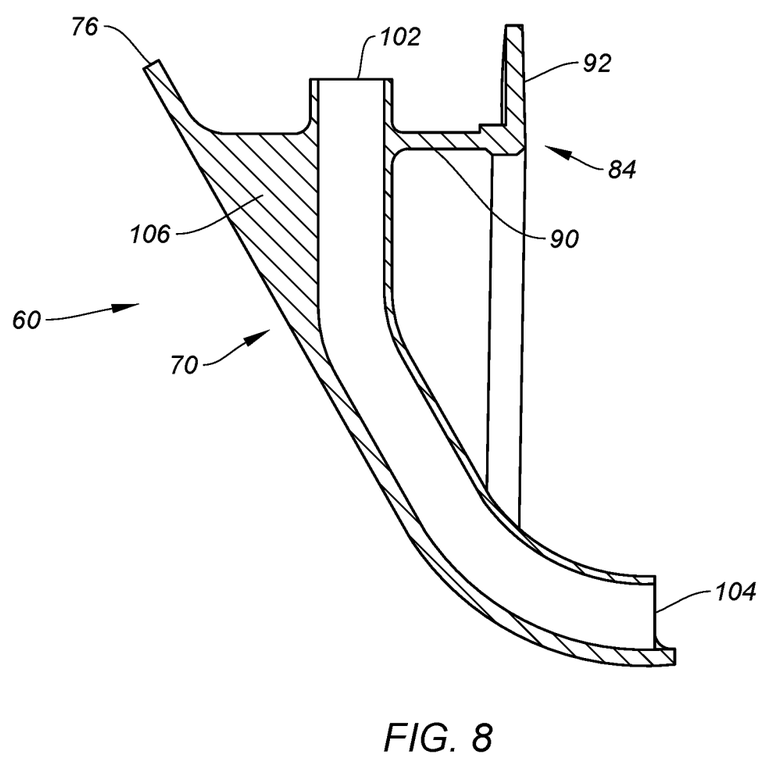
FIG. 8 is a diagrammatic representation of an intermediate structure segment embodiment.

As stated above, in some embodiments all or a portion of the engine oil conduit 72 may be included in the bearing housing 54. In those embodiments wherein the intermediate structure segment 60 is formed using an additive manufacturing process, the additively manufactured intermediate structure segment 60 may include all or a portion of the engine oil conduit 72; e.g., the conduit coupling 94. FIG. 8 diagrammatically illustrates an intermediate structure segment 60 embodiment having an integrally formed engine oil conduit 72; e.g., formed using an additive manufacturing process. In the embodiment shown in FIG. 8, a first end 102 of the engine oil conduit 72 is disposed adjacent to the ring portion 90 of the branch member 84 and a second end 104 is disposed adjacent to the inner radial end 78. In some embodiments, a web portion 106 may extend between the engine oil conduit 72 and the first conical portion 86 of the annular body 74.

Figure 7:
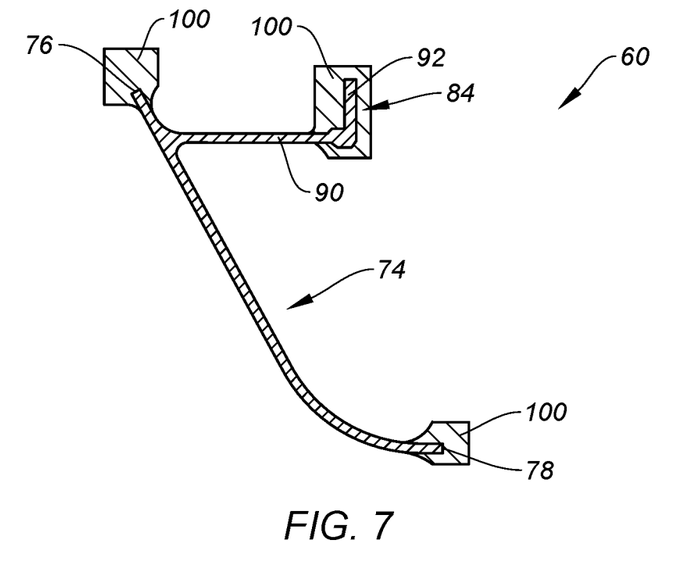
FIG. 7 is a diagrammatic representation of an intermediate structure segment embodiment.

Some embodiments of the present disclosure method may include producing an initial form of the intermediate structure segment 60 that includes a body of material 100 disposed at each of the outer radial end 76, the inner radial end 78, and the radial flange portion of the branch member 84. FIG. 7 diagrammatically illustrates an example of an initial form of an intermediate structure segment 60. In these embodiments, once the initial form of the intermediate structure segment 60 is formed using an additive manufacturing process, including the respective bodies of material 100, each respective body of material 100 may be formed to a final respective configuration (e.g., the outer radial end 76, the inner radial end 78, and the radial flange portion 92 of the branch member 84) using a manufacturing process (e.g., machining or the like) other than additive manufacturing. It is understood that using a manufacturing process other than additive manufacturing may facilitate the production of these final respective configurations; e.g., facilitate tolerancing, producing a desired surface finish, or the like.

Keeping with the example of an intermediate structure segment 60 formed via additive manufacturing, the remaining bearing housing segments (e.g., flange outer structure segment 58, main body segment 62, plenum structure segments 64A-C, and the like) may subsequently be attached to one another to collectively form the annular bearing housing 54. Referring to FIGS. 2 and 3, the flange outer structure segment 58 may be attached to the outer radial end 76 of the intermediate structure segment 60 at attachment point A. The inner radial end 78 of the intermediate structure segment 60 may be attached to a branch extending out from the central member 66 of the main body segment 62 at attachment point B. The first plenum structure segment 64A may be attached to the first plenum structure branch 70A extending out from the central member 66 of the main body segment 62 at attachment point C. The second plenum structure segment 64B may be attached to the second plenum structure branch 70B extending out from the central member 66 of the main body segment 62 at attachment point D. The third plenum structure segment 64C may be attached to the third plenum structure branch 70C extending out from the central member 66 of the main body segment 62 at attachment point E. Each of the aforesaid segments may be attached by a weldment produced using a high precision welding technique.

As stated above, the present disclosure method of producing a gas turbine engine bearing housing 54 includes producing one or more of the bearing housing segments using an additive manufacturing process and subsequently combining the bearing housing segments to form the complete bearing housing 54. The specific example of producing a gas turbine engine bearing housing 54 with an intermediate structure segment 60 formed via an additive manufacturing process is provided above to illustrate the utility of the present disclosure. The present disclosure is not, however, limited to the intermediate structure segment 60 being formed via an additive manufacturing process. In some embodiments, for example, another bearing housing segment (e.g., the annular main body segment 62) may be formed via an additive manufacturing process rather than the intermediate structure segment 60. In some embodiments, more than one bearing housing segment may be formed via an additive manufacturing process (e.g., both the intermediate structure segment 60 and the main body segment 62) and the bearing housing segments subsequently combined to form the complete bearing housing 54.

The present disclosure method is understood to greatly facilitate the manufacture of complex bearing housings 54 in a manner that enables the bearing housing 54 to meet the often stringent performance, safety and reliability requirements. In addition, the present disclosure is understood to provide considerable advantage in those instances where different bearing housing 54 configurations (e.g., for different engine models/configurations) utilize common bearing housing segments. The present method allows common bearing housing segments to be used in the manufacture of bearing housings 54 having different configurations.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f)

unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A method of manufacturing an annular bearing housing for a gas turbine engine, the method comprising:
producing a flange outer structure segment;
producing an intermediate structure segment having an outer radial end, an inner radial end, a body that extends between the outer radial end and the inner radial end, and a branch member that extends outwardly from the body; and
producing a main body segment;
wherein at least one of the flange outer structure segment, the intermediate structure segment, or the main body segment is produced using an additive manufacturing process;
attaching the flange outer structure segment to the outer radial end of the intermediate structure segment; and
attaching the main body segment to the inner radial end of the intermediate structure segment.

2. The method of claim 1, wherein the body of the intermediate structure segment has an inner radial side surface and an outer radial side surface, and the branch member extends outwardly from the outer radial side surface, and the branch member includes a ring portion and a radial flange portion.

3. The method of claim 2, wherein the ring portion of the branch member is configured to communicate with an engine oil conduit.

4. The method of claim 3, wherein a coupling is integrally formed with the ring portion of the branch member, wherein the coupling is configured to communicate with the engine oil conduit.

5. The method of claim 1, wherein the flange outer structure segment is attached to the outer radial end of the intermediate structure segment by weldment and the main body segment is attached to the inner radial end of the intermediate structure segment by weldment.

6. The method of claim 1, further comprising producing at least one plenum structure segment and attaching the at least one plenum structure segment to the main body segment by weldment.

7. The method of claim 6, wherein the at least one plenum structure segment includes a first plenum structure segment, a second plenum structure segment, and a third plenum structure segment and attaching each of the first plenum structure segment, the second plenum structure segment, and the third plenum structure segment to the main body segment by weldment.

8. The method of claim 7, wherein the main body segment includes a central member having a first plenum structure branch, a second plenum structure branch, and a third plenum structure branch; and
wherein the first plenum structure segment is attached to the first plenum structure branch, and the second plenum structure segment is attached to the second plenum structure branch, and the third plenum structure segment is attached to the third plenum structure branch.

9. The method of claim 1, wherein the intermediate structure segment is produced using the additive manufacturing process; and
wherein the step of producing the intermediate structure segment includes producing an intermediate structure segment initial form having a first body of material integrally formed with the body of the intermediate structure segment, a second body of material integrally formed with the body of the intermediate structure segment, and a third body of material integrally formed with the branch member, and includes processing the first body of material to form the outer radial end and processing the second body of material to form the inner radial end.

10. The method of claim 9, wherein the processing the first body of material to form the outer radial end includes removing a portion of the first body of material to form the outer radial end, and the processing the second body of material to form the inner radial end includes removing a portion of the second body of material to form the inner radial end.

11. The method of claim 9, wherein the intermediate structure segment initial form includes a third body of material integrally formed with the branch member, and the step of producing the intermediate structure segment includes processing the third body of material to form the branch member.

12. The method of claim 11, wherein the branch member includes a ring portion and a radial flange portion; and wherein the step of processing the third body of material to form the branch member includes removing a portion of the third body of material to form the radial flange portion.

13. A method of manufacturing an annular bearing housing for a gas turbine engine, the annular bearing housing having a circumference, the method comprising:

producing a flange outer structure segment;

producing an intermediate structure segment having an outer radial end, an inner radial end, a body that extends between the outer radial end and the inner radial end, a branch member that extends outwardly from the body, and a fluid conduit;

wherein the branch member includes a ring portion and a flange portion, and the ring portion extends between body and the flange portion; and wherein a first end of the fluid conduit is disposed adjacent the ring portion and a second end of the fluid conduit is disposed adjacent the inner radial end;

producing a main body segment;

wherein the intermediate structure segment is produced using an additive manufacturing process;

attaching the flange outer structure segment to the outer radial end of the intermediate structure segment; and attaching the main body segment to the inner radial end of the intermediate structure segment.

14. The method of claim 13, wherein the intermediate structure includes a plurality of fluid conduits, the plurality of fluid conduits spaced apart from one another around the circumference of the annular bearing housing.

15. The method of claim 13, wherein the intermediate structure includes a web portion that extends between the fluid conduit and the body.

* * * * *